(12) United States Patent
Simpson et al.

(10) Patent No.: US 6,724,817 B1
(45) Date of Patent: Apr. 20, 2004

(54) ADAPTIVE IMAGE DATA COMPRESSION

(75) Inventors: Thomas Albert Simpson, Northern Ireland (GB); Yi Hu, Northern Ireland (GB)

(73) Assignee: Amphion Semiconductor Limited, Northern Ireland (GB)

( * ) Notice: Subject to any disclaimer, the term of this patent is extended or adjusted under 35 U.S.C. 154(b) by 553 days.

(21) Appl. No.: 09/588,266

(22) Filed: Jun. 5, 2000

(51) Int. Cl.$^7$ ................................................. H04N 7/12
(52) U.S. Cl. .............................. 375/240.07; 375/240.07
(58) Field of Search ....................... 375/240.07, 240.03, 375/240.04, 240.05, 240.06; 348/607; H04N 7/12

(56) References Cited

U.S. PATENT DOCUMENTS

| | | | | |
|---|---|---|---|---|
| 5,126,842 A | * | 6/1992 | Andrews et al. ............. | 348/607 |
| 5,333,212 A | | 7/1994 | Ligtenberg | |
| 5,892,548 A | | 4/1999 | Kim | |
| 6,111,913 A | * | 8/2000 | Murdock et al. ...... | 375/240.03 |
| 6,160,846 A | * | 12/2000 | Chiang et al. .......... | 375/240.05 |
| 6,173,012 B1 | * | 1/2001 | Katta et al. ............ | 375/240.15 |
| 6,215,820 B1 | * | 4/2001 | Bagni et al. ................ | 375/240 |
| 6,263,021 B1 | * | 7/2001 | Sethuraman et al. ... | 375/240.03 |
| 6,373,895 B2 | * | 4/2002 | Saunders et al. ...... | 375/240.19 |

FOREIGN PATENT DOCUMENTS

WO     WO 0018130     3/2000

OTHER PUBLICATIONS

Copy of European Search Report for EP 01 11 3717.

Paper, "Rate–Distortion Optimas Fast Thresholding With Complete JPEG/MPEG Decoder Compatibility", dated Sep. 1994, by Kannan Ramchandran and Martin Vetterli.

* cited by examiner

*Primary Examiner*—Nhon Diep
(74) *Attorney, Agent, or Firm*—Curtis L. Harrington

(57) ABSTRACT

The invention relates to a method and apparatus for compressing an image data signal. The apparatus includes a compression control module arranged to eliminate frequency components produced from the image data signal which have a magnitude less than a threshold value. The apparatus compares the volume of the compressed image data signal with a target volume and selects to increase or decrease the applied compression level depending on the outcome of the comparison. The compression level is increased by increasing the threshold value and deacreased by decreasing the threshold value. The compression level, or ratio, is thus adaptable in real-time in order to meet a target volume for the compressed image. This is particularly advantageous in applications where, for example, the compressed image signal is to be transmitted over a fixed bandwidth link. The method and apparatus of the invention are particularly suitable for use in the implementation of the JPEG basline image compression standard.

16 Claims, 7 Drawing Sheets

ADAPTIVE IMAGE DATA COMPRESSION

FIELD OF THE INVENTION

The present invention relates generally to image data compression. More particularly, the invention relates to a method and apparatus for compressing an image data signal wherein the applied compression level, or ratio, is adaptable.

BACKGROUND OF THE INVENTION

An image, such as a photograph, video still or the like, can be represented digitally by a plurality of data elements, commonly referred to as pixels. For the transmission and storage of an image, it is desirable to compress the digital image data in order to reduce the volume of data which needs to be transmitted or stored. This is particularly important where it is desired to transmit the digital image data across a communications link of limited bandwidth. Image compression techniques are commonly employed in applications such as colour printing, colour image scanning, colour facsimile transmission and multimedia computing.

A problem with conventional image compression techniques is that, for a given image size, it is not possible to predict the volume of data that will be produced after compression. This can result in loss of data in applications involving a fixed bandwidth communication link.

Examples of a conventional image compression techniques are the JPEG standards, such as the JPEG baseline standard and extended sequential JPEG as established by the Joint Photographic Experts Group (JPEG). The JPEG standard involves sub-dividing an image into blocks containing a respective array of pixel values, performing a discrete cosine transform (DCT) on each block to produce an array of frequency coefficients, quantizing the frequency coefficients of each block in accordance with a quantization table, and entropy encoding the quantized coefficients of each block in accordance with a Huffman table to produce compressed image data. The compression ratio achieved by the JPEG is primarily determined by the quantization table and the Huffman table. Since the JPEG standard specifies that the whole image is compressed using the same set of quantization and Huffman tables, there is no means for controlling the compression ratio once the encoding of an image has started. Hence, the volume of compressed data produced is unpredictable and not controllable.

SUMMARY OF THE INVENTION

The present invention provides a method an apparatus for compressing an image wherein the level of applied compression is adaptable to the volume of compressed data produced, in order to meet a target volume of compressed data.

Accordingly, a first aspect of the invention provides an image compression apparatus for compressing an image data signal comprising one or more image data blocks, the apparatus comprising a transform module arranged to transform the or each image data block into an array of frequency coefficients; a quantization module arranged to quantize each of said frequency coefficients according to a respective quantization coefficient; a compression control module arranged to eliminate each [non-zero] frequency coefficient having a magnitude less than a threshold value; an entropy encoding module arranged to generate a coded data element for each non-zero and non-eliminated frequency coefficient to produce a compressed data signal, wherein the apparatus image data signal is processed in image segments, each image segment comprising at least one image data block, and a respective target volume is set for each image segment, the apparatus being arranged to measure the volume of the compressed data signal produced for each image segment, to calculate the difference between the respective target volume and respective measured volume for each image segment, and to sum the calculated differences, the compression control module being arranged to adapt the level of compression applied by the apparatus depending on the value of said summed calculated differences.

By adapting the applied compression level, the apparatus can control the volume of the compressed data produced in order to meet a target so that, for example, the compressed data signal is suitable for transmission over a communication link of limited bandwidth. By eliminating frequency coefficients according to their magnitude, the apparatus minimizes the impact of increasing the compression level on the visual quality of the image data signal when reconstructed.

The invention further provides a method of adapting the level of compression in an image compression apparatus as claimed in claim 10.

Preferred features of the invention are set out in the dependant Claims. Other advantageous aspects of the present invention will become apparent to those ordinarily skilled in the art upon review of the following description of specific embodiments of the invention and with reference to the accompanying drawings.

BRIEF DESCRIPTION OF THE DRAWINGS

An embodiment of the invention is now described by way of example and with reference to the accompanying drawings, in which like numerals are used to denote like components, and in which.

DETAILED DESCRIPTION OF THE DRAWINGS

The present invention relates to the compression, or encoding, of image data, specifically digitized image data. When digitized, an image is represented by a plurality of multi-bit pixels. The pixels are grouped into arrays, or blocks, and are typically processed by a compression apparatus on a block-by-block basis. A colour image comprises a number of components, for example a red (R) component, a blue (B) component and a green (G) component, or two chrominance (U, V) components and a luminance (Y) component, whereas a grayscale image comprises a single component. The, or each, component of an image is represented by blocks of pixels as described above and is processed by an image compression apparatus on a block-by-block basis.

The purpose of image compression is to reduce the quantity or volume of image data to facilitate storage and transmission.

Figure 1:
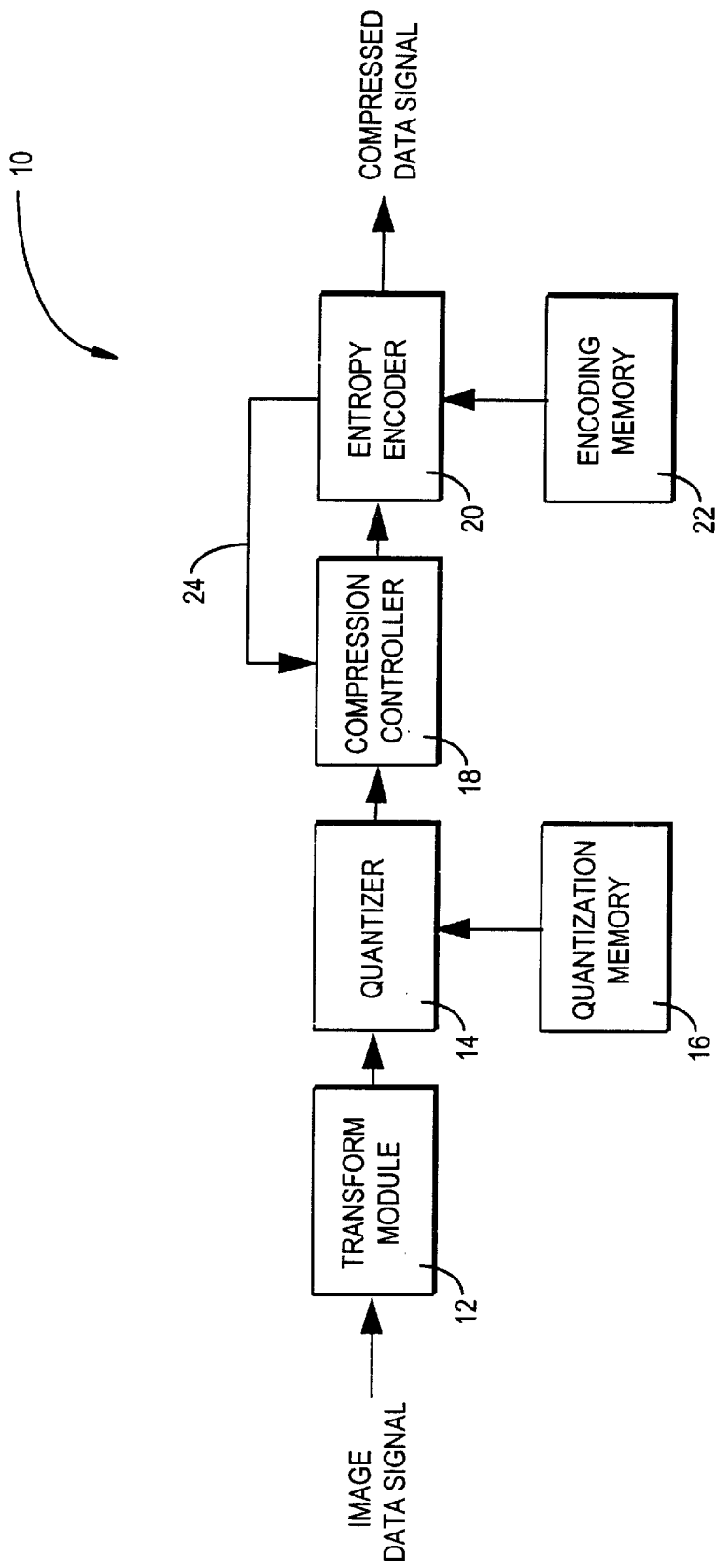
FIG. 1 is a schematic view of an image compression apparatus according to a first aspect of the invention.

In FIG. 1 there is shown, in schematic view, an image compression apparatus, generally indicated at 10, according to a first aspect of the invention. The apparatus 10 is arranged to receive an input image data signal comprising a plurality of image data blocks representing the or each component of a source image (not shown). Each image data block comprises an array of image data elements, or pixels, and each pixel comprises one or more bits of information. Typically, but not necessarily, each pixel comprises eight bits, and each image data block comprises an eight-by-eight array of pixels.

The apparatus 10 outputs a compressed data signal. The level of compression, or compression level, applied by the apparatus 10 determines the volume of the compressed data signal compared to the to the volume of the image data signal for a given block or segment of the image data signal. Commonly, the compression level is expressed as a compression ratio i.e. a ratio of the volume of the compressed data signal to the volume of the image data signal. Thus, an increase in the compression level, or compression ratio, reduces the volume of compressed data produced for a given volume of image data, while a decrease in the compression level, or compression ratio, increases the volume of the compressed data produced for a given volume of image data.

The apparatus 10 includes a transform module 12 for transforming the image data signal from the spatial domain into the frequency domain. The transform module 12 generates a respective array of frequency coefficients for each image data block.

A quantization module, or quantizer 14, is arranged to quantize each of the frequency coefficients in accordance with one or more quantization tables (not shown) which are held in a quantization memory 16. The or each quantization table holds a respective quantization coefficient for each frequency coefficient and the quantization module 14 divides (or multiplies as appropriate) each frequency coefficient with a respective quantization coefficient to generate a respective array of quantized frequency coefficients for each array of frequency coefficients. The quantization operation is performed using integer arithmetic so that each quantized frequency coefficient is rounded up or down to the nearest integer. In particular, it is noted that one or more of the frequency coefficients may be set to zero. The or each frequency component of the source image represented by a frequency coefficient which is set to zero is effectively removed from the image data. Quantization thus introduces losses in the image data such that the source image cannot precisely be reconstructed after quantization has occurred. For this reason, the compression performed by the apparatus 10 is known as a lossy compression. Lossy compression techniques are not considered to be unduly problematic when compressing photographic images since a human observer's (not shown) perception of an image is not significantly impaired by the removal or reduction of certain frequency components of corresponding digitized image data. In particular, the removal or reduction of high frequency components does not significantly reduce the quality of an image to a human observer.

A compression control module, or compression controller 18, is provided to eliminate each non-zero frequency coefficient having a magnitude less than a threshold value. It is preferred that the compression controller 18 is located between the quantizer 14 and the entropy encoder 20 such that it operates on the quantized frequency coefficients produced by the quantizer 14. It is possible, however, to arrange for the compression controller 18 to be located between the transform module 12 and the quantizer 14 such that it operates on the non-quantized frequency coefficients produced by the transform module 12. In a preferred embodiment, the compression controller 18 eliminates, or removes, non-zero frequency components by setting them to zero. Advantageously, the operation of the compression controller 18 is selective in that the controller 18 is programmable to eliminate, or not to eliminate, those frequency coefficients falling below the threshold value. Preferably, the compression controller 18 is arranged to enable the threshold value to be programmable by a human operator (not shown). Preferably still, the compression controller 18 is programmable with more than one different threshold value and is arranged to select one or other of the threshold values, thereby adapting the applied compression level, or ratio, depending on the volume of compressed image data being produced by the apparatus 10, as is explained in more detail below. A preferred embodiment of the compression controller 18 is described in detail with reference to FIGS. 2–5.

The apparatus 10 further includes an entropy encoding module, or entropy encoder 20, arranged to generate a coded data element for each non-zero and non-eliminated frequency coefficient to produce a compressed data signal. The encoder 20 generates each coded data element in accordance with one or more encoding tables held in an encoding memory 22. The compressed data signal includes the coded data elements together with one or more appended data elements relating to the structure of the compressed data signal, as is well known in the art.

The apparatus 10 is arranged to measure the volume of the compressed data signal and to compare the measured volume with a first target volume. To this end, a feedback communication line 24 is provided between the entropy encoder 20 and the compression controller 18. In a preferred arrangement,the entropy encoder 20 measures the volume, in bytes for example, of each coded data element it produces and transmits this information to the compression controller 18. The compression controller 18 calculates the cumulative volume, in bytes for example, of coded data elements generated by the encoder 20 as a measure of the volume of the compressed data signal. It will be apparent that the measurement of the volume of each coded data element and the cumulative volume can both be performed by the entropy encoder 20 or the compression controller 18, or in any other convenient manner. The target volume is programmable by the operator and may be determined by, for example, the bandwidth of a communications link (not shown) across which the compressed data signal is to be transmitted. For example, typically the size of the digitized source image is known, as is the bandwidth of the communications link across which the compressed data signal is to be transmitted. It is therefore possible to calculate the desired compression ratio to be implemented by the compression apparatus 10. Hence, for a given volume of image data blocks, the volume of coded data elements which can be generated without exceeding the desired compression ratio can be calculated.

The target volume can therefore be expressed as a volume of coded data elements, in bytes for example, per group of image data blocks, or of Minimum Coded Units (MCUs) where an MCU comprises one or more image data blocks depending on the composition of the digitized image data. Conveniently, the target volume is the same for each group of image data blocks or MCUs which make up a given source image although this need not necessarily be the case.

The compression controller 18 eliminates those non-zero frequency coefficients whose value is less than the current threshold value by setting the value of said non-zero coefficients to zero. If the measured volume of coded data elements exceeds the target volume, then the compression controller 18 may increase the threshold value so that frequency coefficients of larger magnitude are subsequently eliminated. In this way, the compression controller 18 reduces the volume of coded data elements subsequently generated by the entropy encoder 20 thereby increasing the compression ratio. If the measured volume of coded data elements is less than the first target volume, then the compression controller 18 may select to decrease the threshold value or not to eliminate any non-zero coefficients.

Preferably, the compression controller 18 is programmable with more than one target volume, each specifying a respective target volume of coded data elements. This is advantageous in cases where, for example, an image is scanned more than once when being encoded or compressed. A first target volume may be stipulated for the first scan, while a second target volume may be specified for the second scan, or for each subsequent scan, as required by the user.

The elimination, or removal, of frequency coefficients which have a value i.e. magnitude, less than a given threshold value is advantageous in that the compression controller 18 removes frequency components of the digitized image data according to their importance or significance in the source image, and irrespective of the actual frequency of the component. If the compression controller 18 is required to increase the level of compression, it does so at first by eliminating the frequency coefficients of smaller magnitude, which correspond to the less significant frequency components of the particular source image being compressed. If the compression controller 18 is required to further increase the level of compression, then it increases the threshold value so that it removes incrementally larger frequency coefficients (and therefore incrementally more important frequency components). Thus, the effect of increasing the compression ratio on the visual quality of the source image, when reconstructed, is minimized. In this context, it will be noted that the significance or importance of a frequency component is measured in terms of relative magnitude of that frequency component as opposed to the actual frequency of the component.

It will be apparent from the foregoing that the level of compression, or compression ratio, implemented by the apparatus 10 of the invention is adaptive, or adaptable, in real time to the volume or quantity of compressed image data produced by the apparatus 10. Further, the compression technique implemented by the compression controller 18 is adaptive to the frequency composition of the source image to be compressed in that frequency components are removed on the basis of their importance in the source image.

Figure 2:
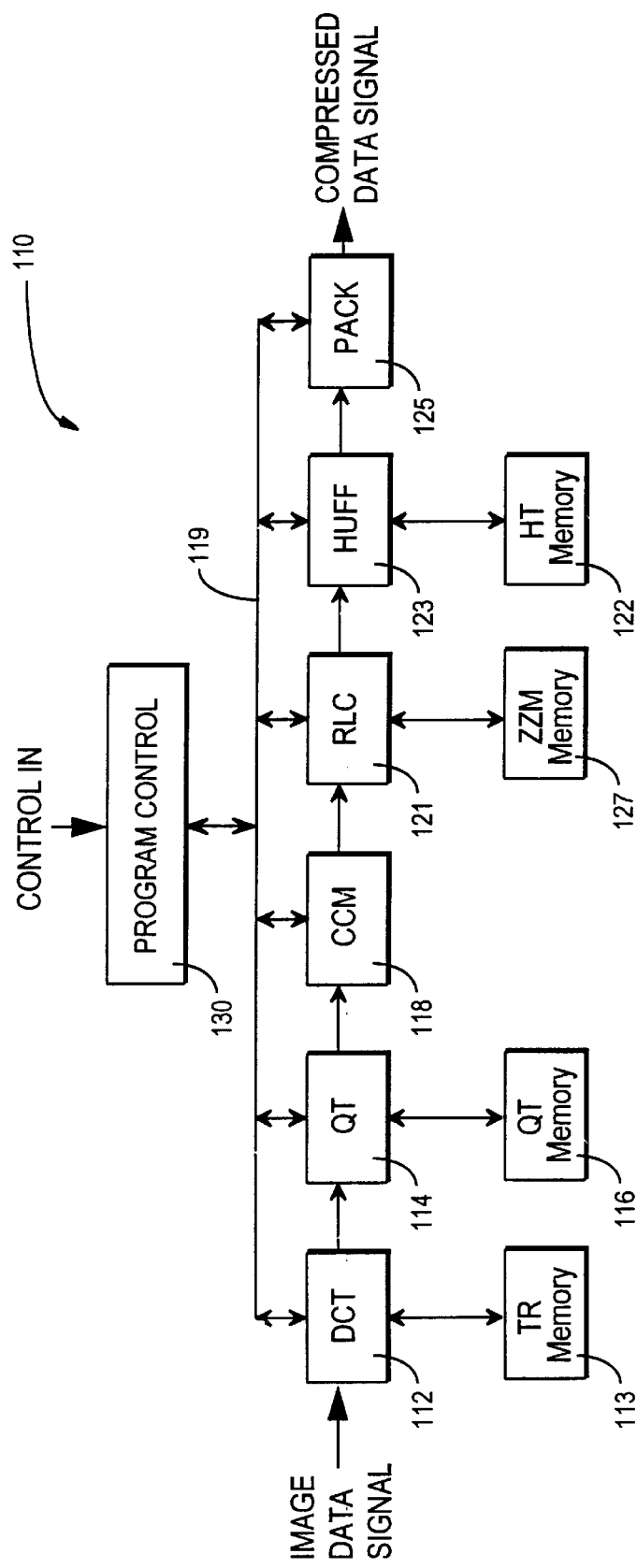
FIG. 2 is a schematic view of a preferred embodiment of the apparatus of FIG. 1, arranged to implement DCT-based image compression.

A preferred embodiment of the invention is now described with reference to FIGS. 2–5 and in the context of image data compression according to the JPEG baseline standard. In the embodiment of FIG. 2, the compression apparatus 110 is arranged to implement sequential JPEG encoding as defined in the JPEG baseline standard (8-bit samples). It will be noted that the apparatus and method of the invention are also applicable for use with other compression standards, such as extended JPEG, and is not limited to an 8-bit sample size or to a particular number of Huffman or quantization tables.

In FIG. 2, the compression apparatus 110 is arranged to receive an image data signal comprising image data blocks each comprising an array (not illustrated) of eight-by-eight image data samples, or pixels, each pixel comprising eight data bits. A transform module in the form of a DCT transform module 112 is arranged to transform, or decompose, each image data block into a corresponding eight-by-eight array (not shown) of frequency coefficients in accordance with conventional DCT algorithms (not shown). The DCT transform produces one DC coefficient and sixty-three AC coefficients for each image data block. By way of example, the transform module 112 uses a two-dimensional transform architecture employing row-composition decomposition to decompose the operation into a two-stage, one-dimensional operation. In this case, a set of intermediate, one-dimensional results is produced and is stored in a transpose memory 113. A skilled person will appreciate that there are many conventional methods of performing a DCT transform which are also suitable. The present invention is not limited to the method outlined above. The preferred arrangement enables sustained one sample per clock cycle data processing. The DCT transform module 112 produces frequency coefficients comprising eleven data bits.

A quantization module or quantizer 114 divides each of the sixty-four DCT frequency coefficients produced for each image data block by a respective quantization value, in conventional manner, to produce sixty-four quantized DCT frequency coefficients, each comprising eleven data bits. The quantization coefficients are selectable from four quantization tables, each table being held in the quantization table memory 116. Preferably, the quantization tables are determined by the operator and loaded into the quantization table memory 116 via a program control module 130. The operator may also select which of the four quantization tables is to be used via the program control module 130. It will be apparent that the number of qunatization tables used is not critical.

The apparatus 110 includes an entropy encoder comprising a Run Length Coding (RLC) module 121, a Huffman encoding module 123 and a packing module 125. The RLC module 121 generates a respective first coded data element for each non-zero quantized frequency coefficient. Each coded data element comprises a Run component and a Size component, appended to the respective non-zero coefficient data. The Run component represents the number of zero-value quantized frequency coefficients that were encountered between the current non-zero coefficient and the previous non-zero coefficient. The Size component represents the number of data bits required to represent the current non-zero coefficient. In order to produce coded data elements efficiently, it is preferred that the RLC module processes the quantized frequency coefficients in a zig-zag manner, i.e., that it processes the coefficients in ascending order of frequency. This tends to maximize the length of the runs of zero-value coefficients and, since a long run of zero-value coefficients is recorded in a single coded data element, the number of coded data elements produced is minimized. To this end it is preferred that the RLC module 121 reads the quantized frequency coefficients from a zig-zag memory 127. This is achieved in conventional manner by the provision of re-ordering logic (not shown) in the RLC module 121 comprising a counter and an LUT which together generate the desired zig-zag address sequence. There are other equally suitable ways of obtaining coefficients in zig-zag order, as will be apparent to a skilled person. Further, the zig-zag re-ordering need not necessarily be performed at the RLC module 121 but may alternatively be performed beforehand at, for example, the quantizer 114.

The huffman encoder 123 is arranged to receive the coded data elements produced by the RLC module 121 and to generate a respective second, or Huffman, coded data element for each RLC coded data element. The second coded data elements are derived from a Huffman table held in the Huffman table memory 122. Huffman encoding is intended to minimize the number of bits required to represent the RLC coded data elements. Each code in a Huffman table is unique and corresponds with a particular combination of Run and Size components. The Huffman codes are variable in size and, advantageously, the more commonly occurring combinations of Run and Size are assigned to the shorter Huffman codes. Each Huffman coded data element comprises a respective Huffman code appended to respective frequency coefficient data. Advantageously, the Huffman table memory is programmable with a plurality of Huffman tables, one or more table for the DC frequency coefficients, the remaining tables for the AC frequency coefficients. Preferably, there are four Huffman tables, two for the DC frequency coefficients and two for the AC frequency coefficients. It will be noted that, in conventional manner, the RLC module 121 does not produce a Run component for the DC coefficients. The Huffman tables may be loaded by, and are, in use, selectable by, the operator via the program control module 130. The Huffman encoder 123 does not necessarily produce coded data elements contiguously—this depends on the nature of the source image data provided to the apparatus 110.

The packing module 125 is arranged to receive the second coded data elements generated by the Huffman encoder 123, join the coded data elements together, and then split them into units of, for example two-bytes. The packing module 125 outputs the two-byte units serially to produce the compressed data signal. It is noted that the compressed data signal further includes data structure information, in conventional manner as laid down by the JPEG baseline standard, to enable reconstruction. This is not described herein for reasons of clarity.

A compression control module (CCM), or compression controller 118, is preferably arranged between the quantizer 114 and the RLC module 121. The compression controller 118 is arranged to communicate with, in particular, the Huffman encoder 123 via communication line 119 (which serves as the communication line 24 depicted in FIG. 1). In use, the compression controller 118 counts the cumulative volume of coded data elements, in bytes for example, produced by the Huffman encoder 123 and compares the measured volume with a target volume. To enable corrective action to be taken by the compression controller 118, the target volume is defined for a portion, or segment, of the source image rather than for the source image as a whole. Typically, the target volume is defined in, for example, bytes per MCU, or per group of MCUs.

If the measured volume exceeds the target volume, then the compression controller 118 may take action to increase the compression level, or ratio, in order to reduce the volume of coded data elements produced for subsequent MCUs or groups of MCUs. Equally, if the measured volume is less than the target volume, the compression controller 118 may reduce the compression ratio. As described above, the compression controller 118 is arranged to remove, or eliminate, any quantized frequency coefficients whose magnitude is less than a threshold value. Preferably, the compression control module 118 is provided with a plurality of threshold values, which for example are user programmable via the program control module 130, and is arranged to select a respective one of said threshold values depending on the required change in compression ratio. For example, if, having removed all the frequency coefficients of magnitude below a first threshold value, the compression controller 118 determines that the cumulative measured volume of coded data elements is still over target for the overall image, then the controller 118 selects a higher threshold value in order to remove a larger number of frequency coefficients in the image data blocks of subsequent image segments, thereby further increasing the compression ratio.

In order to reduce the compression ratio, the controller 118 can select a lower threshold value so that fewer frequency coefficients are removed. Further, the controller 118 may select not to remove any frequency components if the volume of the coded data elements is on target. The compression ratio applied by the apparatus 110 is thus adaptive in order to meet the predetermined overall target volume for the compressed image.

A preferred embodiment of the compression controller 118 is now described with reference to FIGS. 3–5. Referring first of all to FIG. 5, which is a schematic view of an architecture for the compression controller 118, a first input signal NewBlk is asserted to indicate the arrival of each new, or successive, image data block from the quantizer 114. The quantized frequency coefficients associated with each respective image data block are received by the controller 118 as input signal DctCoeff. A variable time later, the quantized freqency coefficients associated with each data block are processed by the Huffman encoder 123. The Huffman encoder 123 is arranged to generate a signal NumBytes each time it produces a Huffman coded data element. The Numbytes signal indicates the number of bytes contained within each respective Huffman coded data element produced, and is received by the compression controller 118 via communication line 119. The Huffman encoder is arranged to generate a further signal BlkDone each time it finishes processing an image data block. The BlkDone signal is also received by the compression controller 118 via communication line 119.

In the present example, the measurement of the volume of coded data elements is conveniently performed for respective successive segments, or portions, of a source image, wherein each image segment comprises one or more MCU. An MCU may comprise one or more image data block depending on the strucure of the source image. Thus, the compression controller 118 is provided with two variable paramenters namely, NumBlksMcu, which indicates the number of image data blocks per MCU in the source image to be processed, and NMcu, which indicates the number of MCUs in each image segment. NMcu is selectable by the operator and provided to the compression controller 118 via the program control module 130. NumBlksMcu is determined by the structure of the source image to be processed and is also provided to the compression controller 118 via the program control module 130. It will be apparent that the controller 118 need not necessarily operate on groups of one of more MCUs—the image data may be operated on in segments in any convenient manner.

The compression controller 118 is also provided with one or more target volumes for each image segment. In the preferred embodiment, two target volumes are provided, one for the first scan of the source, the other for all subsequent scans of the image. The target volumes are determined by the operator as described above and are provided to the compression controller 118 via the program control module 130. The value of the target volume is represented in FIG. 5 by Target.

The compression controller 118 is further provided with one or more threshold values. In the preferred embodiment, a plurality of threshold values of increasing magnitude are defined and are each associated with a respective control action level, L. For illustrative purposes, the compression controller 118 in the present example selectively employs one of eight control action levels, L=0 to L=7, depending on the severity of the control action which must be taken to meet the overall target volume for the compressed image. At the lowest control action level, L=0, the controller 118 is arranged to remove no quantized coefficients and therefore the threshold value is set to zero. From L=1 to L=7, the respective associated threshold value increases, preferably in even increments, and the controller 118 is arranged to remove all quantized frequency coefficients on or below the threshold value of the selected level.

It is particularly preferred to associate more than one threshold value with each control action level which requires a threshold value, the controller 118 being arranged to apply a respective threshold value to respective groups of quantized frequency coefficients depending on the spectral significance of the frequency coefficients within the groups. In the present example, each of the control action levels L=1 to L=7 is associated with three respective threshold values, the first for application to quantized frequency coefficients 1–15, the second for application to coefficients 16–31, and the third for coefficients 32–63. This allows more control over the effect that the applied compression has on the visual quality of the reconstructed image. For example, coefficients 1–15 normally represent the lower frequency components of the source image which, as described above, are more important to an observer's perception of an image than the higher frequency components represented by coefficients 16–31 or 32–63. Thus the threshold value for application to coefficients 1–15 is advantageously set lower than the threshold value for coefficients 16–31, which in turn is advantageously lower than the threshold value for coefficients 32–63. The, or each, threshold value for the, or each, control action level is selectable by the operator and provided to the compression controller 118 via the program control module 130.

Figure 3:
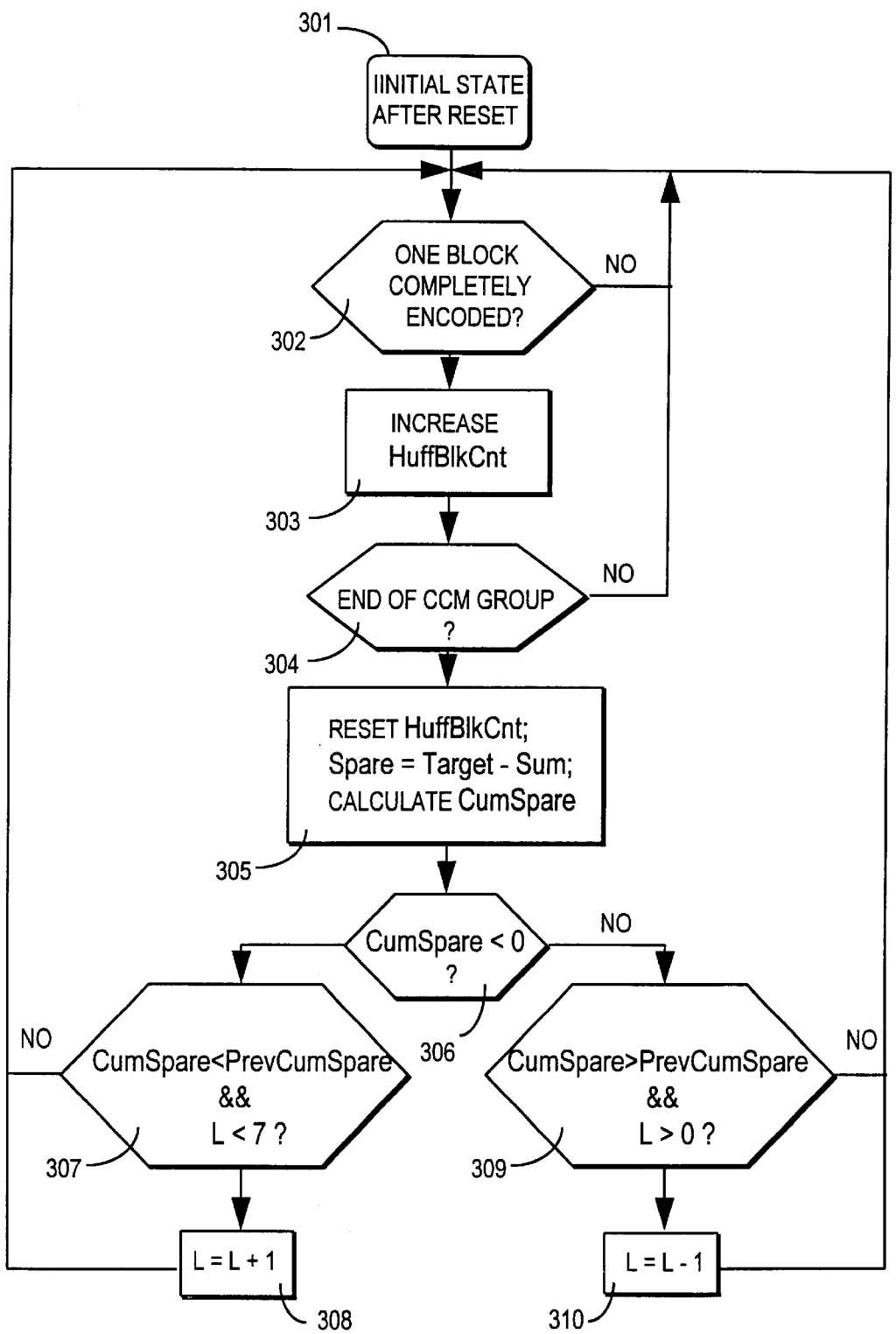
FIG. 3 is a first flow diagram illustrating the operation of a compression control module included in the apparatus of FIG. 2.

FIG. 3 is a flow chart illustrating the process whereby the compression controller 118 of the preferred embodiment determines which control action level, L, to apply. Module 301 represents the initial state of the controller 118 after reset. Initially, the controller 118 is arranged to apply level 0 (L=0) control action which, in the present example, means that the controller 118 is not required to increase the compression ratio over that inherently applied by the apparatus 110 in the absence of the controller 118 i.e. the controller 118 does not remove any frequency coefficients.

Modules 302, 303 and 304 define the period over which the volume of coded data elements produced by the Huffman encoder 123 is measured. In the present example, a respective volume measurement is performed for sucessive source image segments, where the size of an image segment is defined by NMcu. In module 302, the controller 118 determines when a complete image data block is processed by the Huffman enocder 123 (via the BlkDone signal). In module 303, the controller 118 counts the number of processed image data blocks and updates a count variable HuffBlkCnt. In module 304, the controller 118 determines when an image segment is processed i.e. when HuffBlkCnt is equal to NMcu. During modules 302, 303 and 304, the controller 118 counts, or measures, the volume of coded data elements produced by the Huffman encoder 123 and records the volume accumulated for the current image segment as variable Sum.

At module 305, the controller 118 resets HuffBlkCnt and calculates the difference between the measured value for Sum and the target volume Target for said current image segment. The difference is stored as variable Spare, where Spare=Target−Sum. The controller 118 also sums the respective values of Spare for each successive image segment to produce CumSpare.

At module 306, the controller determines whether Cum-Spare is positive or negative. If CumSpare is negative, this is indicative that the current level of compression may not result in the target volume for the overall image being met and that, accordingly, an increase in the control action level L may be required. The controller 118 then progresses to module 307 where it makes a further determination as to whether an increase in the control action level L is required. Specifically, the controller 118 checks whether the current value for CumSpare is less than the previous value for CumSpare (indicated in FIG. 3 as PrevCumSpare) i.e. whether or not the current value of Spare is negative. The controller 118 also checks whether the current action level L is less than the maximum action level (which is 7 in the present example). If the current CumSpare value is less than the previous CumSpare value and the current action level L is not at the maximum level, then the controller selects a higher control action level (module 308) thereby increasing the applied compression level in order to meet the target volume for the overall compressed image, otherwise the controller 118 leaves the control action level unchanged.

If, at module 306, it is determined that CumSpare is positive, this is indicative that the current level of compression will result in the target volume for the overall image being met and that a decrease in the control action level L may be in order. The controller 118 then progresses to module 309 where it makes a further determination as to whether a decrease in the control action level L is in order. Specifically, the controller 118 checks whether the current value for CumSpare is greater than the previous value for CumSpare (indicated in FIG. 3 as PrevCumSpare) i.e. whether or not the current value of Spare is positive. The controller 118 also checks whether the current action level L is greater than the minimum action level (which is 0 in the present example). If the current CumSpare value is greater than the previous CumSpare value and the current action level L is not at the minimum level, then the controller selects a lower control action level (module 310) thereby decreasing the applied compression level, otherwise the controller 118 leaves the control action level unchanged.

It will be noted that the process for calculating the control action level L as described above and with reference to FIG. 3, is not limiting. In particular, a skilled person will appreciate that other criteria for increasing or decreasing the control action level L may be employed. For example, a cruder version of the compression controller (not illustrated) may select the control action level L solely on the basis of whether the Spare value is positive or negative, or whether the CumSpare value is increasing or decreasing. The process of FIG. 3 is preferred as it performs a more sophisticated analysis of whether or not the target volume for the overall compressed image will be met and therefore produces more accurate results.

Figure 4:
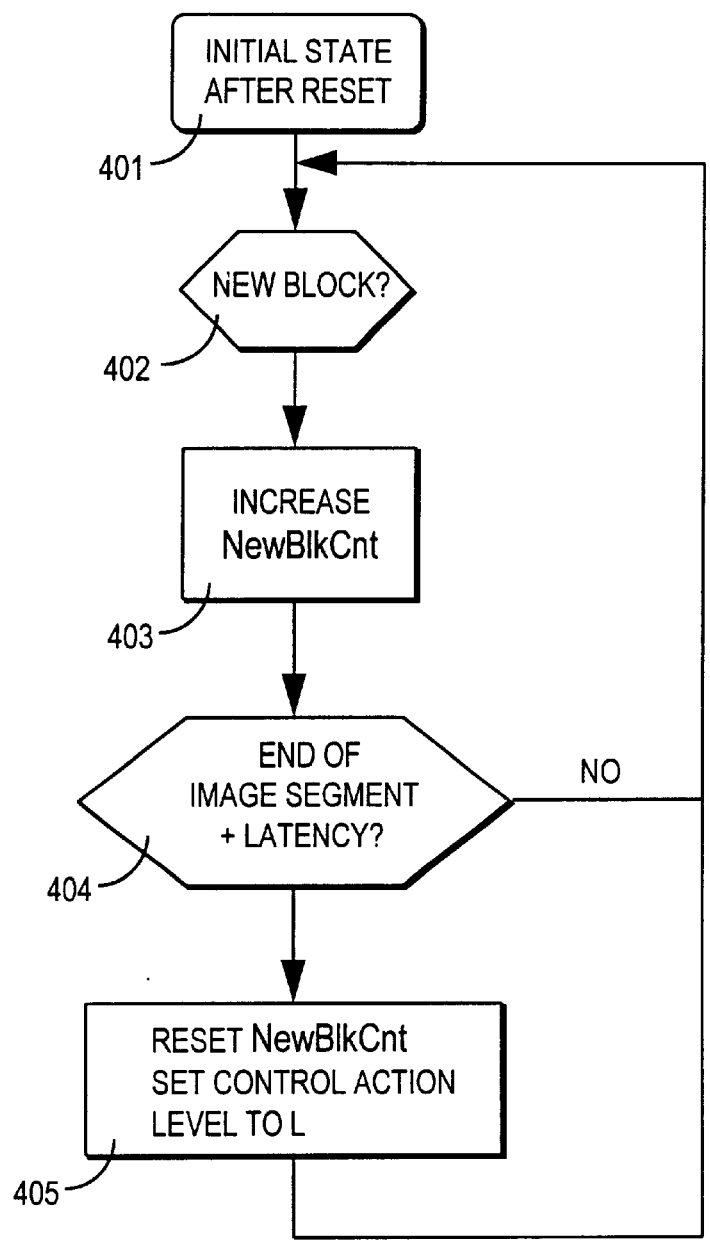
FIG. 4 is a second flow diagram illustrating the operation of the compression control module.
Figure 5:
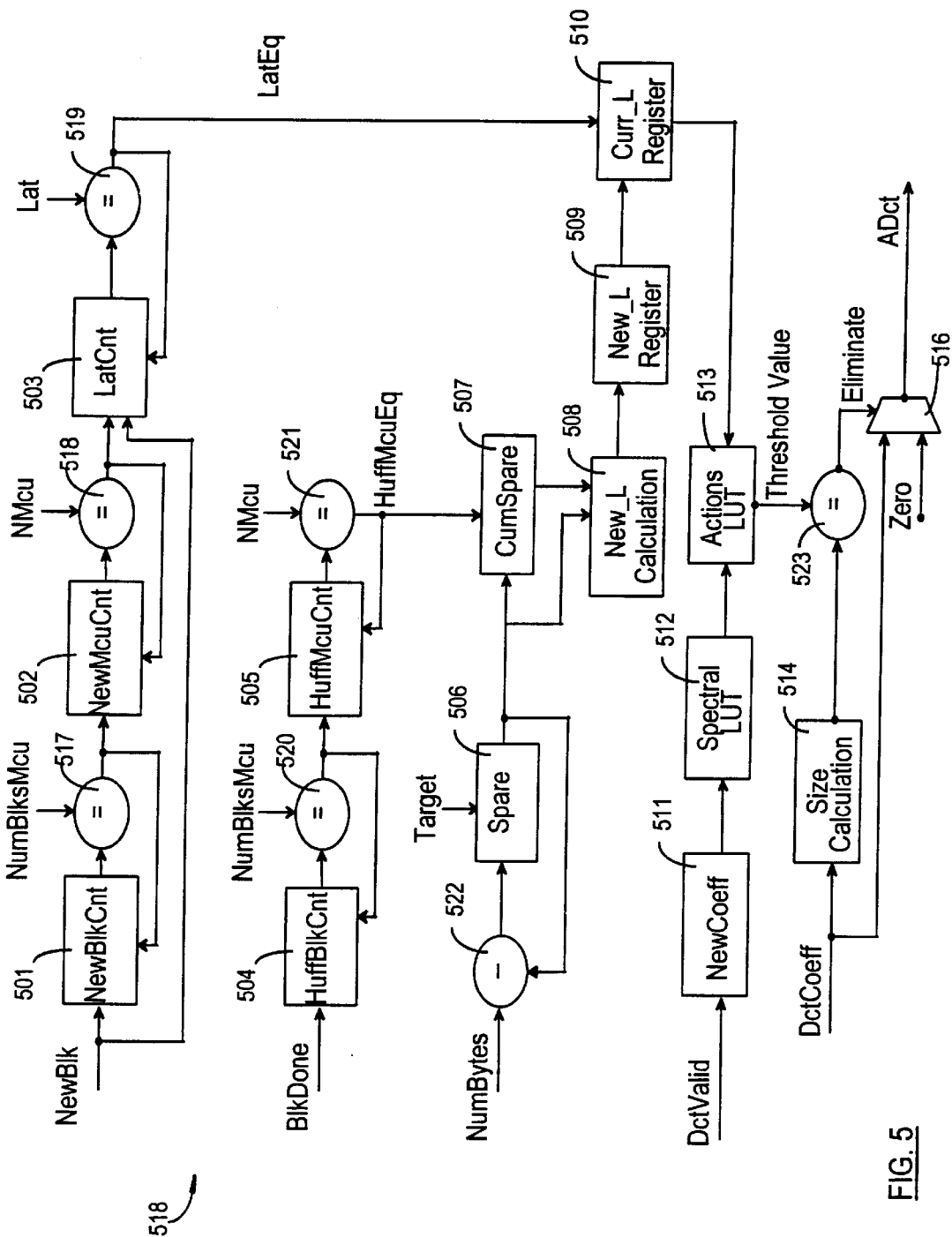
FIG. 5 is a schematic view of an architecture for the compression control module.

FIG. 4 is a flow chart illustrating how the compression controller 118 applies a newly selected control action level L. In a simple embodiment of the invention, once a new value of L is calculated, the corresponding threshold value (s) are applied to the next, and all subsequent, image data blocks received by the compression controller 118 until L changes again. However, the flow of data through the apparatus 110 is not necessarily uniform, and is therefore not necessarily predictable, as it is dependent on how the source image data is received by the apparauts 110. It is therefore not possible to say when the new value for L will be available. It is however possible to say that the new value of L will be available within a given number of image data blocks after the group of MCUs, which correspond to the current image segment, have entered the compression controller 118. Said given number of image data blocks is hereinafter referred to as Latency and the controller is preferably arranged to apply a newly calculated control action level L Latency image data blocks after the end of the current image segment. Also, to prevent data loss in the event that an external apparatus (not shown) is not able to receive the output of the apparatus 110 at the same rate at which it is produced, the packing module 125 advantageously has an output enable signal which can be used to stall, or delay, the data output. If this signal is de-asserted, then this causes data to build up in the RLC and Huffman modules 121, 123. The space allowed for this build-up means that input data can still be processed continuously as long as the stall is not too long. The amount of data that can be stored is fixed, but represents a variable number of data blocks depending on the compression ratio. This number of blocks has an upper limit, which also corresponds to Latency. In the present example Latency is set equal to 6. This arrangement allows the operation of the apparatus 110 to be more predictable and enables a bit-accurate model, for example a C-model, to be produced.

Module 401 represents the initial state after reset. At module 402, the controller 118 detects the arrival of a new image data block from the quantiser 114 (the new block arrival being indicated by the signal NewBlk, FIG. 5). At module 403, the controller 118 increments a variable NewBlkCnt for each new image data block received. At module 404, using the known values for NumBlksMcu and NMcu together with the current value of NewBlkCnt, the controller determines when the end of the current image segment occurs. Then, the controller 118 counts, or waits for, the arrival of a further number (Latency) of image data blocks before proceeding to Module 405. At module 405, the controller resets NewBlkCnt and sets the current control action level L to the newly calculated value.

As described above, the compression controller 118 measures the volume of coded data elements produced for successive image segments, wherein each segment comprises a group of one or more MCUs, and compares the measured volume against a target volume for the image segment. Further, the controller 118 calculates the required control action level L after each image segment is processed. It is preferred that the group comprises more than one MCU in order to smooth out the operation of the controller 118 by averaging the density of the image data over the group size. Thus, if a particular image data block or MCU contains a particularly high, or low, information content, the controller 118 does not necessarily respond by increasing, or decreasing respectively, the control action level L—the effect of such an extreme data block or MCU is averaged over the group size. If the group size is too small, then the controller 118 may react too quickly. On the other hand, if the group size is too large, the controller 118 may not react quickly enough. The result in either case may be that the target volume for the overall image is not be met or that portions of the source image are compressed at an unecessarily high level.

Referring again to FIG. 5, the compression controller 118 is arranged to receive each of the required parameters NumBlksMcu, NMcu, Latent, and Target, as indicated in the Figure, from the program control module 130. The control action level L is initially set to 0 and this value is recorded in register 510 (designated Curr_L in FIG. 5). In the present example, each control action level L is associated with three respective threshold values, as explained above, and each respective set of three threshold values is provided to the controller 118 by the program control module 130 and stored in a Look-up table (LUT) an LUT 513 (designated Actions LUT in FIG. 5).

In overview, the compression control apparatus 118 performs the following operations. It receives and stores the parameters as outlined above; it counts the number of MCUs that pass through it; it counts the number of MCUs processed by the Huffman encoder 123; it counts the volume (in bytes) of coded data elements produced by the Huffman encoder 123; it calculates an appropriate value for the control action level L; and it removes all quantized frequency coefficients of magnitude less than that specified by the current control action level L. These operations are now described in more detail.

Each time a new image data block is input to the compression controller 118 by the quantizer 114, it is accompanied by the signal NewBlk. Each time the NewBlk signal is asserted, the value of NewBlkCnt, which is stored in register 501, is incremented. The value of NewBlkCnt is compared with the value of NumBlksMcu at comparator module 517. When NewBlkCnt equals NumBlksMcu, NewBlkCnt is re-set to zero and the value of a variable NewMcuCnt, which is stored in register 502, is incremented. NewMcuCnt is a measure of how many MCUs have been received by the compression controller 118. Comparator module 518 compares the value of NewMcuCnt with NMcu. When NewMcuCnt equals NMcu, the comparator module 518 signals to a register 503 that a complete image segment has been received. Register 503 holds a variable LatCnt. Each time the comparator module 518 indicates that a complete image segment has been received, the variable LatCnt is incremented for each subsequent new image data block received. To this end, the NewBlk signal is also fed directly to register 503. Comparator module 519 compares the value of LatCnt with the stored value for Latency. When LatCnt equals Latency, then a signal LatEq is asserted for one cycle. It will be apparent that the portion of the compression controller 118 described above, namely registers 501, 502, 503 and comparator modules 517, 518 and 519 are optional and are only required when it is desired to implement a newly calculated control action level L after a specified period of time (as defined by Latency).

Each time the Huffman encoder 123 finishes encoding an image data block, it asserts the BlkDone signal and the value of HuffMcuCnt, which is held in register 504, is incremented. Comparator module 520 compares the value of HuffBlkCnt with the value of NumBlksMcu. When HuffBlkCnt equals NumBlksMcu, the value of variable HuffMcuCnt, which is stored in register 505, is incremented by a signal from the comparator module 520. The variable HuffMcuCnt is representative of the number of MCUs processed by the Huffman encoder 123. Comparator module 521 compares the value of HuffMcuCnt with the known value of NMcu. When the value of HuffMcuCnt reaches the value ATMcu, HuffMcuCnt is re-set to zero and a signal HuffMcuEq is asserted for one cycle.

The Huffman encoder 123 is arranged to calculate or count the number of data bits it produces when generating coded data elements i.e. to calculate the volume of coded data elements produced. In the present embodiment, the Huffman encoder 123 is arranged to provide said volume in bytes and so the number of data bits counted is divided by eight, with any remainder data bits being stored for use in subsequent calculations. Thus, every time the Huffman encoder 123 produces a coded data element, it calculates the number of bits produced and adds this to the number of remainder bits left over from previous calculations. The calculated volume is divided by eight to convert to bytes and output as signal NumBytes. During any cycle were a coded data element is not produced by the Huffman encoder 123, NumBytes is set to zero. The NumBytes signal is received by the compression controller 118 as indicated in FIG. 5. Register 506 stores a value for Spare which is initially set equal to the target volume for an image segment. The received value of NumBytes is subtracted from the value of Spare by subtrator module 522.

CumSpare Register 507 holds a value CumSpare to which the value of Spare is added each time signal HuffMcuEq is asserted. The respective values of Spare and CumSpare are supplied to register 508 (which is designated New_L Calculation in FIG. 5) for evaluation. If the respective values for Spare and CumSpare are both negative, then a new value for the control action level L is calculated as L+1 (up to a limit of L=7. If the respective values of Spare and CumSpare are both positive, then a new value for the control action level L is calculated as L-1 (down to a minimum of L=0). The newly calculated value for the control action level L is stored in register 509 (designated as New_L register in FIG. 5). When signal LatEq is asserted, the newly calculated L value is transferred to the Curr_L register 510.

Figure 6:
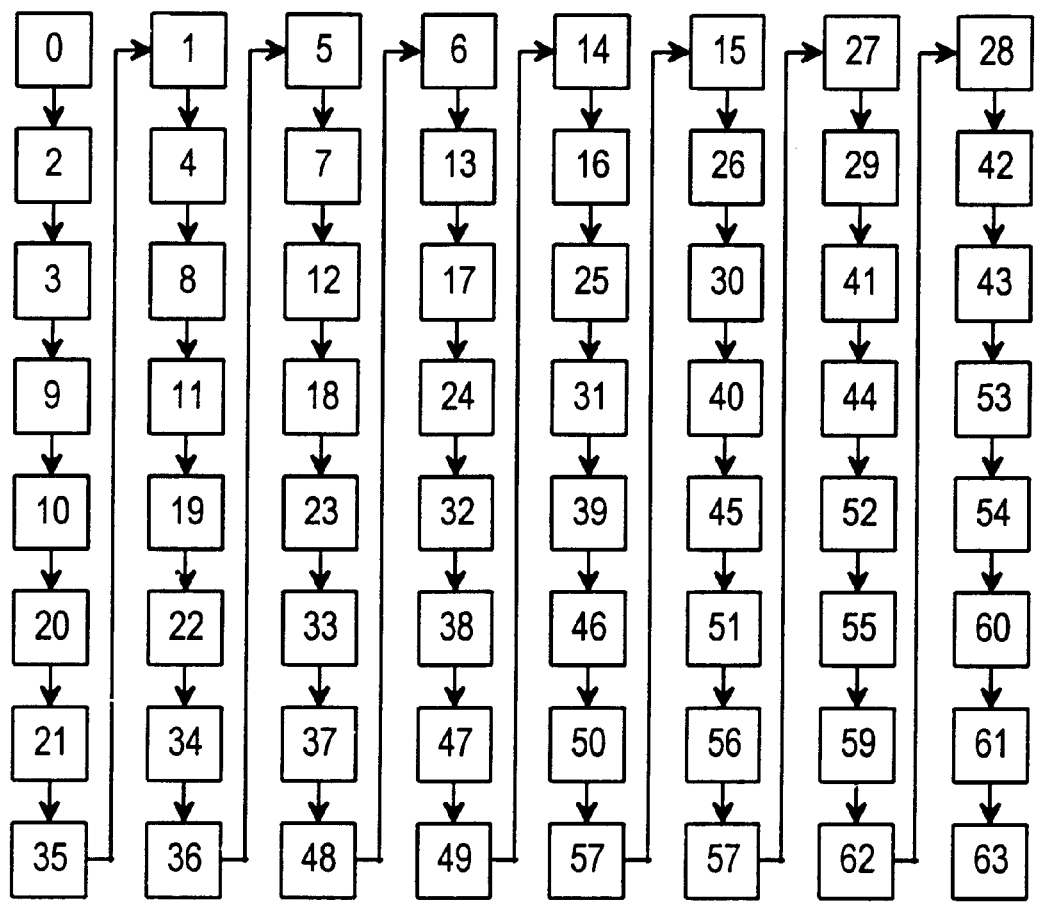
FIG. 6 is a representation of an 8×8 array of quantized frequency coefficients.

Since, in the preferred embodiment, each control action level L is associated with three respective threshold values, each for application to a respective set of quantized frequency coefficients produced for each image data block, the compression controller 118 must calculate the relative position of each quantized frequency coefficient within its respective array. FIG. 6 is a representation of an 8×8 array of quantized frequency coefficients wherein the arrows indicate the input order of the coefficients. In the present example, coefficients 0 to 15 are designated as being in region zero of the array, coefficients 16 to 31 are designated as being in region 1 of the array and coefficients 32 to 63 are designated as being in region 2. A respective threshold value is applied to the coefficients according to the region in which they lie.

As the quantized frequency coefficients are input to the compression controller 118 (via signal DctCoeff) they are each accompanied by a DctValid signal. Each time DctValid is asserted, the value of a variable NumCoeff, which is stored in Register 511, is incremented. NumCoeff is supplied to a spectral LUT 512 which determines which region of the frequency coefficient array, or spectrum, a given frequency coefficient is from.

The Spectral LUT 512 supplies this information to the Actions LUT 513, which also receives the current value of control action level L from Register 510. The actions LUT 513 is thus able to calculate the threshold value which is to be applied to the current quantized frequency coefficient as received in signal DctCoeff.

A size calculation module 514 is arranged to receive the incoming quantized frequency coefficient in signal DctCoeff and calculates the size of each coefficient in accordance with, for example, Table 1 below.

TABLE 1

| Size | Amplitude |
|---|---|
| 0 | 0 |
| 1 | -1, 1 |
| 2 | -3, -2, 2, 3 |
| 3 | -7, . . ., -4, 4, . . ., 7 |
| 4 | -15, . . ., -8, 8, . . ., 15 |
| 5 | -31, . . ., -16, 16, . . ., 31 |
| 6 | -63, . . ., -32, 32, . . ., 63 |
| 7 | -127, . . ., -64, 64, . . ., 127 |
| 8 | -255, . . ., -128, 128, . . ., 255 |
| 9 | -511, . . ., -256, 256, . . ., 511 |
| 10 | -1023, . . ., -512, 512, . . ., 1023 |
| 11 | -2047, . . ., -1024, 1024, . . ., 2047 |

The calculated coefficient size is fed to comparator 523 which also receives the relevant threshold value from the actions LUT 513. If the calculated coefficient size is equal to or less than the relevant threshold value, then signal Eliminate is asserted.

Figure 7:
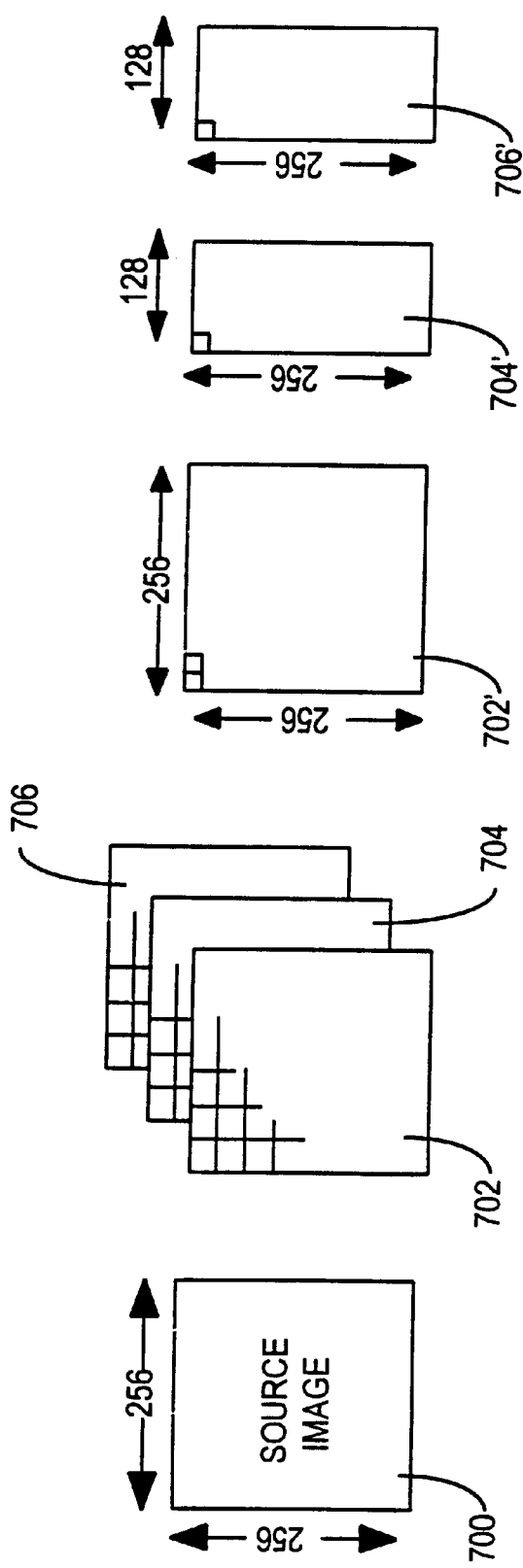
FIG. 7 is a representation of a source image and constituent image components.

A multiplexor 516 is arranged to receive the signal DctCoeff as one input, and the value zero as a second input. The signal Eliminate serves as the control signal for the multiplexor 516 such that, when Eliminate is asserted, the zero input is selected at the output ADct of the multiplexor 516, otherwise ADct takes the value of the current quantized frequency coefficient as provided by DctCoeff. By selecting zero when Eliminate is asserted, the compression troller 118 effectively removes or eliminates the current quantized frequency coefficient. An example calculation of a target volume for an image segment is now given with reference to FIG. 7. For this example, it is assumed that the size of a source image 700 is 256 bytes×256 bytes and comprises three colour components 702, 704 and 706. The horizontal sampling factors are 2, 1, 1 for components 702, 704 and 706 respectively and the respective vertical sampling factors are 1, 1, 1 (see components 702', 704', 706' in FIG. 7). NMcu is set at 10 and the desired compression ratio is assumed to 20:1.

The source image size is first calculated, assuming 8-byte samples per component. Thus:

Source image size=256×256×3=197 KB

Using the given horizontal and vertical sampling factors, it is deduced that each MCU is comprised of two 8×8 blocks from the first component 702, one 8×8 block from the second component 704, and one 8×8 block from the third component 706. Thus the total number of MCUs in the source image 700 is calculated as 512. The target volume in bytes for one scan of the source image is then calculated as follows:

$$\text{Target volume} \approx \frac{(197,000)(10)}{(512)(20)} = 192$$

Due to the latency as described above, it is advantageous, but not essential, to set the target volume to deliver a slightly smaller compressed image than is actually required.

The invention described above relates to an image compression apparatus 10, 110 and in particular to an image compression apparatus for implementing the JPEG baseline standard. In order to reconstruct an image compressed by the apparatus 10, 110, a conventional decompression apparatus (not shown) is required.

The invention is not limited to the embodiments described herein which may be modified or varied without departing from the scope of the invention.

What is claimed is:

1. An image compression apparatus for compressing an image data signal comprising one or more image data blocks, the apparatus comprising a transform module arranged to transform the or each image data block into an array of frequency coefficients; a quantization module arranged to quantize each of said frequency coefficients according to a respective quantization coefficient; a compression control module arranged to eliminate each frequency coefficient having a magnitude less than a threshold value; an entropy encoding module arranged to generate a coded data element for each non-zero and non-eliminated frequency coefficient to produce a compressed data signal, wherein the image data signal is processed in image segments, each image segment comprising at least one image data block, and a respective target volume is set for each image segment, the apparatus being arranged to measure the volume of the compressed data signal produced for each image segment, to calculate the difference between the respective target volume and respective measured volume for each image segment, and to sum the calculated differences, the compression control module being arranged to adapt the level of compression applied by the apparatus depending on the value of said summed calculated differences.

2. An apparatus as claimed in claim 1, wherein the compression control module is arranged to increase the level of compression by increasing the threshold value, and to decrease the level of compression by decreasing the threshold value.

3. An apparatus as claimed in claim 1, wherein the compression control module is arranged to adapt selectively the applied compression level after an image segment is processed, the selection further depending on the value of the calculated difference for said image segment.

4. An apparatus as claimed in claim 3, wherein the compression control module selects to increase the applied compression level if, after processing an image segment, the sum of the calculated differences is negative and the individual calculated difference for said image segment is also negative, and selects to decrease the applied compression level if the sum of the calculated differences is positive and the individual calculated difference for said image segment is also positive.

5. An apparatus as claimed in claim 1, wherein each applicable compression level is associated with more than one threshold value, the compression control apparatus being arranged to apply a respective threshold value to one or more frequency coefficients depending on the spectral significance of said one or more frequency coefficients in the image data signal.

6. An apparatus according to claim 1, wherein the compression controller is arranged between the quantization module and the entropy encoder, and to operate on the quantized frequency coefficients.

7. An apparatus according to claim 1, wherein the apparatus is arranged to implement sequential JPEG encoding, the entropy encoding module including a run length coding module and a Huffman encoder, the compression controller being arranged to supply the non-zero quantized frequency coefficients to the Huffman encoder via the run length coding module, the Huffman encoder being arranged to produce a respective coded data element for each non-zero quantized frequency coefficient, to measure the volume of each produced coded data element and to communicate the measured volume to the compression control module.

8. An apparatus as claimed in claim 7, wherein the Huffman encoder is arranged to sum said measured volumes for each image data block, to signal to the compression control module when each image data block is processed and to communicate to the compression control module the respective sum of the measured volumes for each image data block.

9. In an image compression apparatus for compressing an image data signal comprising one or more image data blocks, the apparatus comprising a transform module arranged to transform the or each image data block into an array of frequency coefficients; a quantization module arranged to quantize each of said frequency coefficients according to a respective quantization coefficient; a compression control module arranged to eliminate each frequency coefficient having a magnitude less than a threshold value; and an entropy encoding module arranged to generate a coded data element for each non-zero frequency coefficient to produce a compressed data signal, wherein the image data signal is processed in image segments, each image segment comprising at least one image data block, and a respective target volume is set for each image segment, a method of adapting the level of compression applied by the apparatus, the method comprising: measuring the volume of the compressed data signal produced for each image segment; calculating the difference between the respective target volume and respective measured volume for each image segment; summing the calculated differences; and adapting the level of compression applied by the apparatus depending on the value of said summed calculated differences.

10. The image compression apparatus as claimed in claim 9, wherein the applied compression level is increased by increasing the threshold value, and decreased by decreasing the threshold value.

11. The image compression apparatus as claimed in claim 10, wherein the applied compression level is selectively adapted after an image segment is processed, the selection further depending on the value of the calculated difference for said image segment.

12. The image compression apparatus as claimed in claim 11, further including increasing the applied compression level if, after processing an image segment, the sum of the calculated differences is negative and the individual calculated difference for said image segment is also negative; or decreasing the applied compression level if the sum of the calculated differences is positive and the individual calculated difference for said image segment is also positive.

13. The image compression apparatus as claimed in claim 9, wherein each applicable compression level is associated with more than one threshold value, the method further including applying a respective threshold value to one or more frequency coefficients depending on the spectral significance of said one or more frequency coefficients in the image data signal.

14. The image compression apparatus as claimed in claim 9, wherein the compression controller is arranged to operate on the quantized frequency coefficients.

15. The image compression apparatus as claimed in claim 9, wherein the apparatus is arranged to implement sequential JPEG encoding, the entropy encoding module including a run length coding module and a Huffman encoder, the method further including supplying the non-zero quantized frequency coefficients to the Huffman encoder via the run length coding module, producing a respective coded data element for each non-zero quantized frequency coefficient; measuring the volume of each produced coded data element; and communicating the measured volume to the compression control module.

16. The image compression apparatus as claimed in claim 15, the method further including summing the measured volumes for each image data block; signalling to the compression control module when each image data block is processed; and communicating to the compression control module the respective sum of the measured volumes for each image data block.

* * * * *